C. L. TOLLES.
TRACTION BELT.
APPLICATION FILED FEB. 24, 1913.

1,106,596.

Patented Aug. 11, 1914.
2 SHEETS—SHEET 1.

WITNESSES

INVENTOR
CHARLES L. TOLLES
BY
ATTORNEYS

C. L. TOLLES.
TRACTION BELT.
APPLICATION FILED FEB. 24, 1913.

1,106,596.

Patented Aug. 11, 1914.

2 SHEETS—SHEET 2.

WITNESSES

INVENTOR
CHARLES L. TOLLES
BY
ATTORNEYS

UNITED STATES PATENT OFFICE.

CHARLES L. TOLLES, OF EAU CLAIRE, WISCONSIN.

TRACTION-BELT.

1,106,596.  Specification of Letters Patent.  Patented Aug. 11, 1914.

Application filed February 24, 1913. Serial No. 750,400.

*To all whom it may concern:*

Be it known that I, CHARLES L. TOLLES, a citizen of the United States, resident of Eau Claire, county of Eau Claire, State of Wisconsin, have invented certain new and useful Improvements in Traction-Belts, of which the following is a specification.

The object of my present invention is to provide a belt in which the links and traction shoes are formed in one piece, thereby reducing the number of parts and simplifying the construction.

A further object is to provide a form of link having means for excluding sand and gravel from the bearings of the sprocket wheels therein.

A further object is to provide a traction belt in which the friction of the belt on its bearings is reduced to a minimum, resulting in less power being required for operating the belt than usual in traction belts as ordinarily constructed.

A further object is to provide a traction belt which will allow the convenient separation of one or more of the links and shoes without disturbing the remaining portion of the belt.

The invention consists generally in various constructions and combinations, all as hereinafter described and particularly pointed out in the claims.

Figure 1:
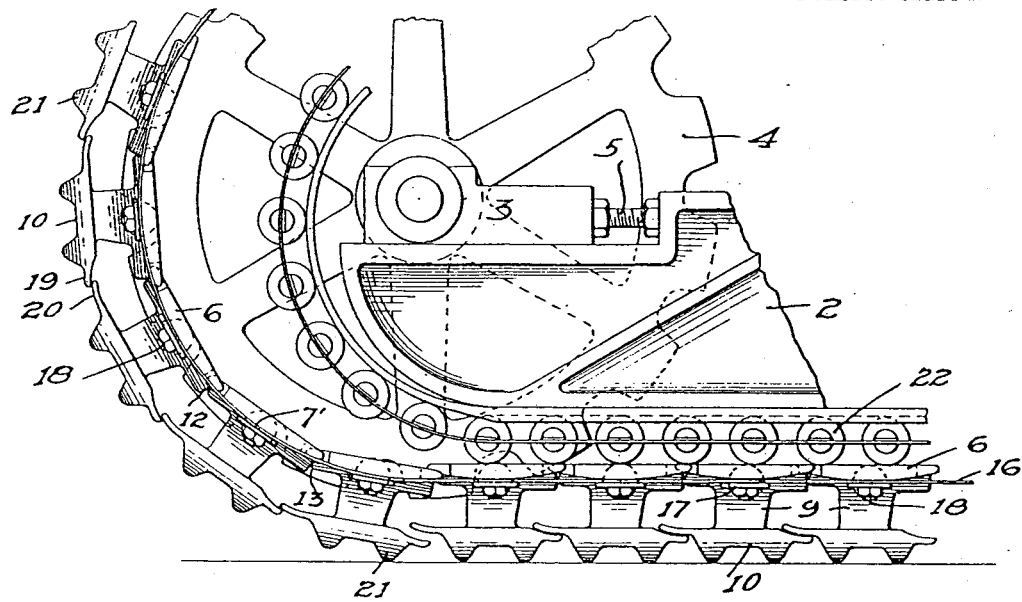
Figure 2:
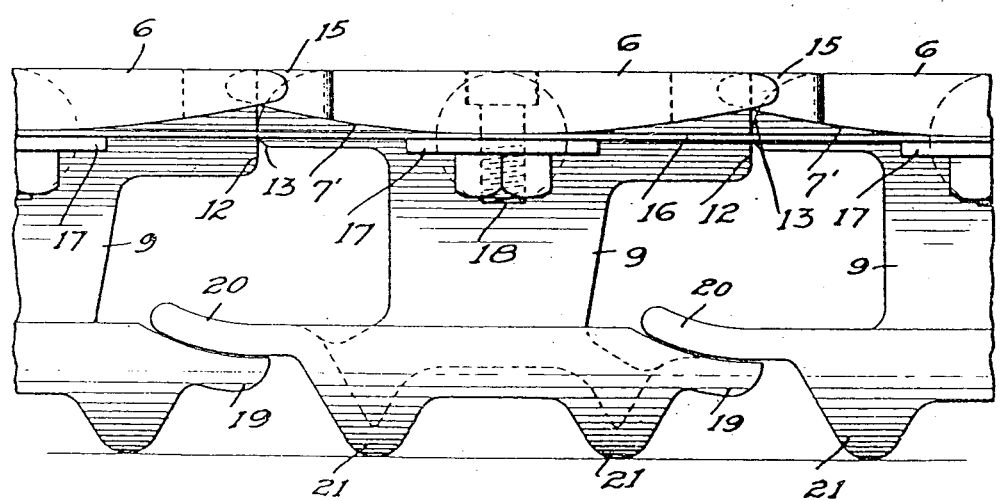
Figure 3:
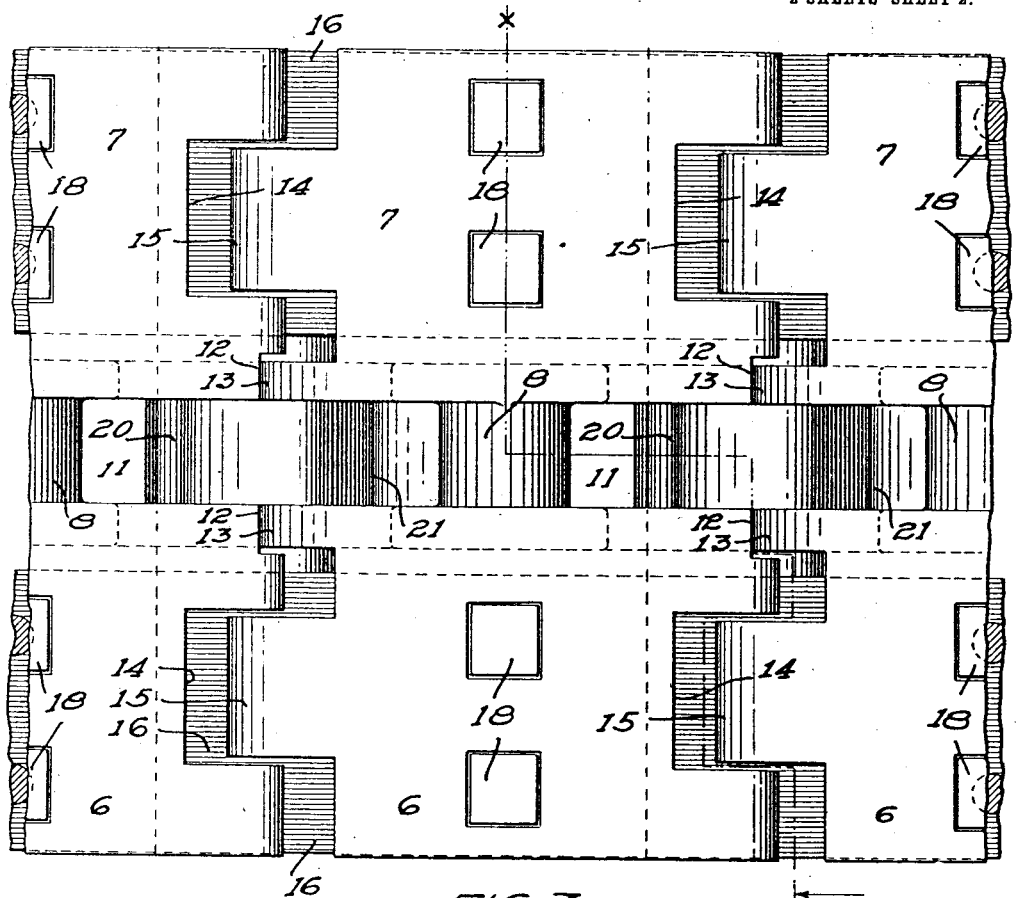
Figure 4:
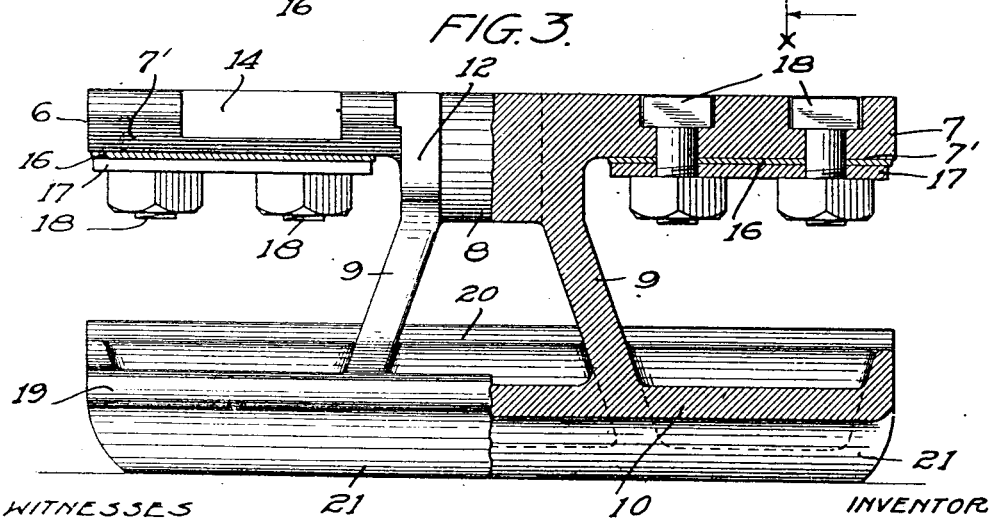

In the accompanying drawings forming part of this specification, Figure 1 is a side view, illustrating a portion of a traction belt and my improved traction belt thereon, Fig. 2 is a detail view of a portion of the belt, showing the interlocking arrangement of the links and the manner of securing the flexible bands to the links, Fig. 3 is a plan view of the links and the connecting bands, Fig. 4 is a sectional view on the line $x$—$x$ of Fig. 3.

In the drawing, 2 represents a portion of a frame, having bearings 3 for a sprocket wheel 4, said bearings being adjustable on said frame by means of the adjusting screw 5. The links composing the traction belt each comprise wings 6 and 7 having flat upper surfaces substantially, and rounded or curved under surfaces 7' extending from front to rear of said wings. The inner portions of the wings of each link are spaced apart and connected by a bridge wall 8 from the ends of which webs 9 depend to an integral, transversely arranged shoe 10. These parts are all preferably cast in one piece.

The bridge walls 8, of which there is one for each link of the traction belt, are spaced apart, forming suitable openings 11 to receive the teeth of the sprocket wheel 4 between them, the bridge walls being circular, preferably, in cross section to fit into the recesses between the teeth of the sprocket wheel. The wings 6 and 7 of each link have flat inner bearing faces 12 at one end to receive the rounded bearing faces 13 of the adjoining link, the rounded surfaces allowing the links to turn upon one another in passing around the sprocket wheel and conform to the circle of the wheel without unnecessary friction or strain on the belt. These bearing surfaces will also serve to exclude any sand or gravel from the bearing of the links on the sprocket wheel. Primarily, however, they are designed to facilitate the turning of the links on the drive wheels. The rear ends of the wings 6 and 7 are also provided with recesses 14 to receive the projections 15 of the wings 6 and 7 of the adjoining link. The links are connected by flexible metal bands, similar to those shown and described in my application filed November 1, 1912, Serial No. 729,115. These bands are shown in Fig. 4 indicated by reference numeral 16 and fit the under curved surface of the wings 6 and 7 and have plates 17 bearing thereon which are secured to said wings, preferably by means of bolts 18 arranged in pairs and passing through said wings.

The traction shoes 10, as heretofore stated, are formed integrally with the webs 9 and have heel portions 19 and toe or nose portions 20, the toe of one shoe overlapping the heel of the succeeding shoe and both have curved bearing surfaces which are adapted to fit snugly together and prevent sand and gravel from working in between the shoes in the operation of the belt. The shoe preferably has transverse friction ribs or corrugations 21, so that when the links are assembled there will be provided a series of transverse ribs at intervals on the outside of the belt to dig into the soil and increase the traction of the machine. The lower run or stretch of the belt has bearings on an antifriction belt 22 which is fully shown and described in my pending application above referred to.

The flexible connection between the links of the belt is covered in my application above referred to, this case relating to the particular form of link which I may employ in the construction of the belt.

I claim as my invention:—

1. A traction belt comprising a series of links, each link consisting of an inner portion having openings therein to receive the teeth of a sprocket wheel, flexible devices bridging the gaps between said links, one of said flexible devices being located on one side of said opening and the other on the other side thereof, and means for clamping said flexible devices to said links, said links having outwardly projecting portions and traction shoes thereon, said inner portions, said outwardly projecting portions and said shoes being cast in one piece.

2. A traction belt comprising a series of links, each having an inner sprocket wheel engaging portion and webs projecting outwardly therefrom, and traction shoes carried by said webs, said shoes, said webs and said inner portions being cast in one piece, and an endless flexible means connecting said links one with another upon opposite sides of the middle portions thereof.

3. A traction belt comprising a series of links, each having laterally projecting wings spaced apart and a bridge wall between them, webs projecting from the inner portions of said wings, traction shoes mounted on said webs, and flexible connecting bands secured to the under surfaces of said wings.

4. A traction belt comprising a series of links, each having an inner sprocket wheel engaging portion and webs projecting outwardly therefrom and traction shoes carried by the webs, said shoes, said webs and said inner portions being cast in one piece, said inner portions of the wings having rounded out bearing faces and endless flexible devices secured to said outer bearing faces.

5. A traction belt comprising links having laterally projecting spaced wings and sprocket wheel engaging means connecting them, webs projecting from said wings, traction shoes carried by said webs, said wings, webs and shoes being cast in one piece, and spaced flexible endless devices securing the corresponding wings of adjoining links together.

6. A traction belt comprising links, each having laterally projecting wings and a bridge connecting them, and webs projecting from the inner portions of said wings, said links having openings therein to receive the teeth of a sprocket wheel, a traction shoe carried by said webs, and flexible bands secured to the outer surfaces of said wings.

7. A traction belt comprising links, each having laterally projecting spaced wings and sprocket wheel engaging means connecting the same, webs projecting outwardly from the inner portions of said wings, a traction shoe carried by said webs, flexible bands fitting the outer faces of the wings, plates seated on the bands and secured to said wings, one end of the inner portion of each wing having a flat bearing face and the other end of each wing having a rounded bearing face adapted to coöperate with said flat bearing face.

In witness whereof, I have hereunto set my hand this 19th day of February, 1913.

CHARLES L. TOLLES.

Witnesses:
J. AMUNDSON,
F. C. BARLOW.